Feb. 21, 1939. G. DAVIDSON Re. 21,007

METHOD FOR THE PRODUCTION OF TOBACCO ARTICLES

Original Filed Dec. 5, 1932 4 Sheets-Sheet 1

INVENTOR.
Glenn Davidson
BY
Gray, Oberlin & Gray
ATTORNEYS.

METHOD FOR THE PRODUCTION OF TOBACCO ARTICLES
Original Filed Dec. 5, 1932 4 Sheets-Sheet 2
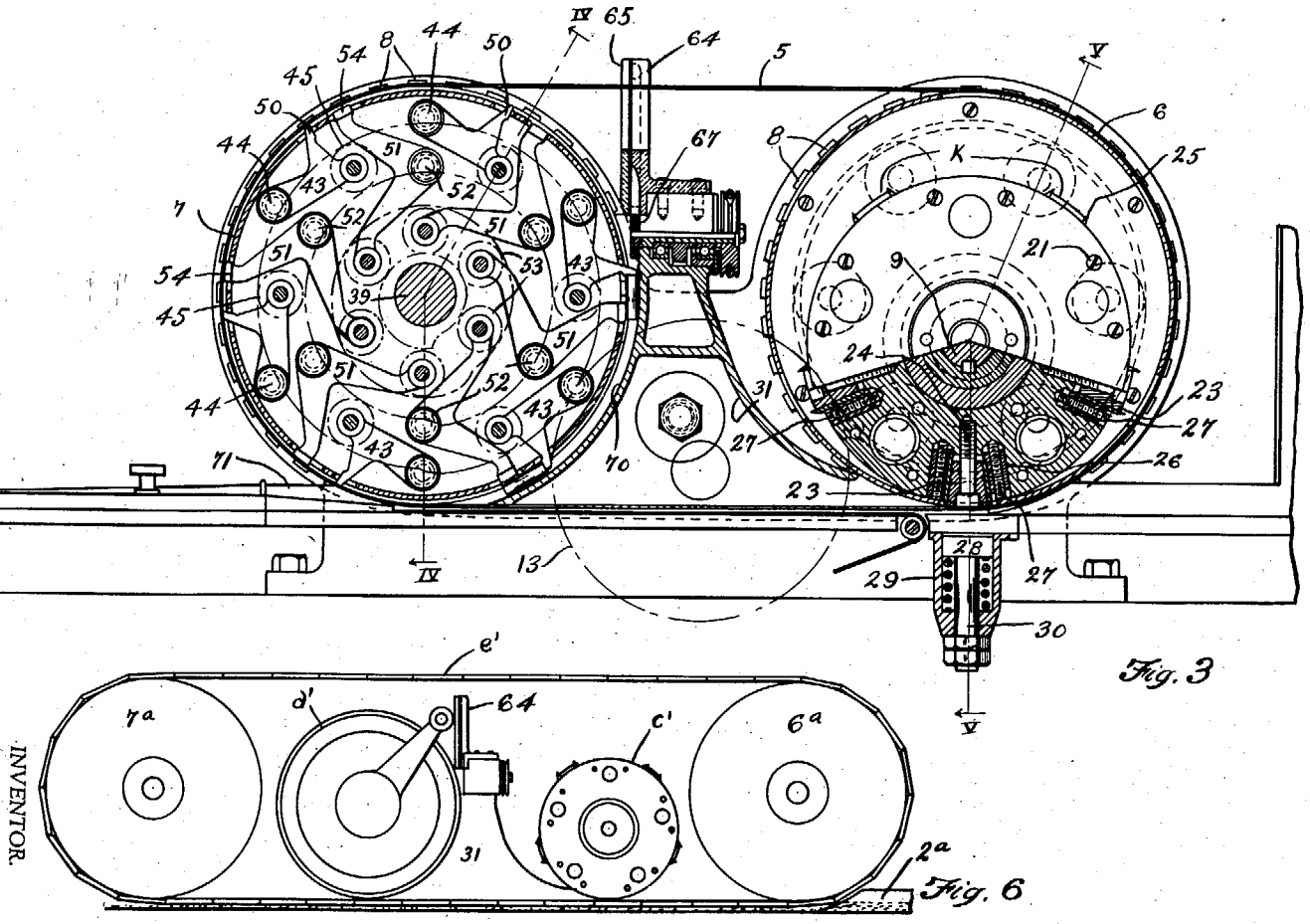
INVENTOR.
Glenn Davidson
BY
Fay, Oberlin & Fay
ATTORNEYS.

METHOD FOR THE PRODUCTION OF TOBACCO ARTICLES

Original Filed Dec. 5, 1932 4 Sheets-Sheet 3

INVENTOR.
Glenn Davidson
BY
Fay, Oberlin & Fay
ATTORNEYS.

Feb. 21, 1939. G. DAVIDSON Re. 21,007

METHOD FOR THE PRODUCTION OF TOBACCO ARTICLES

Original Filed Dec. 5, 1932 4 Sheets-Sheet 4

INVENTOR.
Glenn Davidson
BY
Bay, Oberlin & Bay
ATTORNEYS.

Reissued Feb. 21, 1939 Re. 21,007

UNITED STATES PATENT OFFICE 21,007

METHOD FOR THE PRODUCTION OF TOBACCO ARTICLES

Glenn Davidson, Aurora, Ill.

Original No. 1,963,076, June 19, 1934, Serial No. 645,709, December 5, 1932. Application for reissue June 5, 1936, Serial No. 83,778

18 Claims. (Cl. 131—39)

Figure 1:
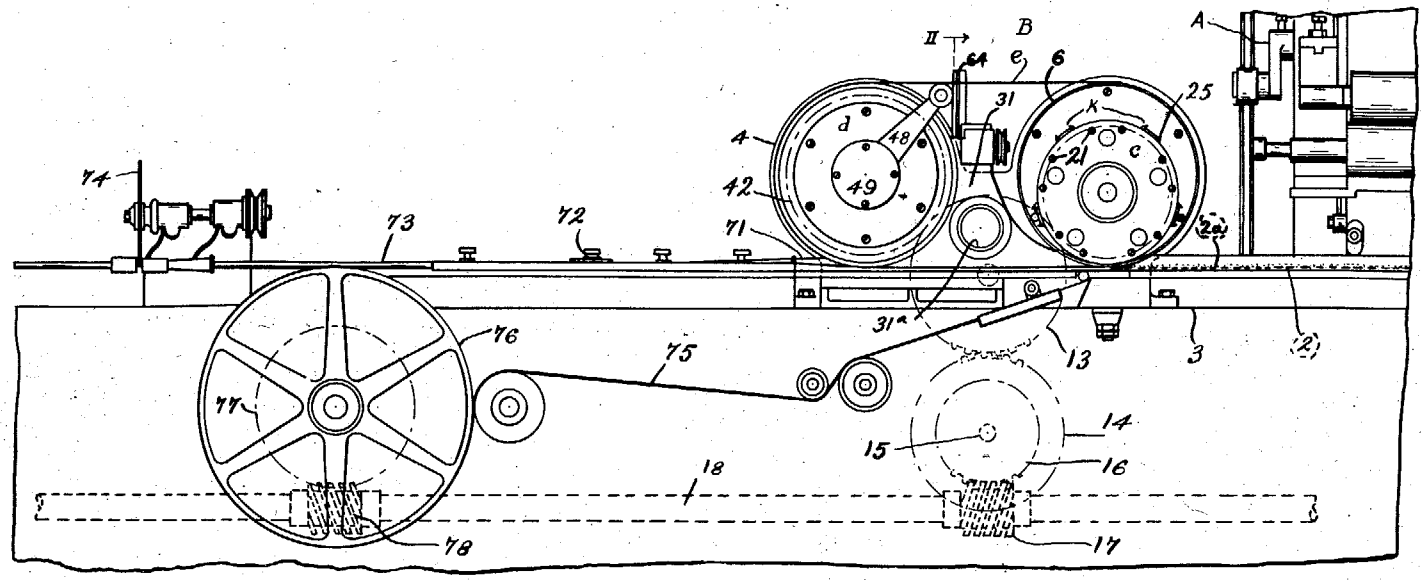

This invention relates to the manufacture of mouth-piece cigarettes, i. e. cigarettes which contain within their wrapper, at the end to be received into the mouth, an insert of paper or other material, which for convenience, may be called a plug.

The desirability of such cigarettes has long been recognized because of their numerous advantages, among which may be listed the following: the prevention of the "shedding" of shreds of tobacco into the mouth; the avoidance of the waste of expensive tobacco otherwise contained in the "butt", which is thrown away, i. e. the substitution therefor of comparatively inexpensive paper; the prevention of the loss of tobacco from the end of the cigarette, while it is being carried in a pocket or purse, which loss leaves the cigarette soft between the lips; the much higher standard of sanitation possible in an insert made of paper, for example, which is handled entirely mechanically as compared to a natural product like a leaf of tobacco which must, of necessity, be handled many times by human fingers; the presentation of a firm feeling between the lips, similar to a cork tipped cigarette; a material reduction in the fire hazard of the discarded "butt", when fire resistant paper or other material is used in making the mouthpiece plug.

In addition, it may be said that, if the mouthpiece plugs are properly made, they produce no change in the draft or flavor of the cigarette, as compared to a cigarette composed entirely of tobacco.

Despite the fact that mouthpiece cigarettes have numerous advantages to the smoker; that they would have the cigarette manufacturers vast sums of money annularly by the substitution of comparatively inexpensive paper for expensive tobacco; and further could reasonably be expected to materially reduce our national fire loss, they have not come into use in the case of commercial tobacco cigarettes. While some medicated cigarettes contain mouthpieces, medicated cigarettes are usually made individually and so the insertion of an insert mouthpiece is a relatively simple matter as compared to the case of the commercial tobacco cigarettes, which are made by continuously sifting tobacco onto a travelling web of wrapper paper to form a wind-row of tobacco, closing and sealing the wrapper about this wind-row of tobacco to form a cigarette rod which is cut into individual cigarettes. Machines of this type are known in commerce as "continuous rod" type cigarette machines, in distinction from machines which form cigarettes individually. Such machines produce cigarettes at rates varying from 750 to 1400 cigarettes per minute per machine. Accordingly, the insertion of the "insert" or "plug" type of mouthpieces within the wrappers of commercial tobacco cigarettes, during the course of their manufacture by existing high speed methods, has presented mechanical difficulties which have not been solved heretofore.

One of the objects of the present invention is to provide what might be aptly described as an attachment for the present existing continuous rod type cigarette machines, which can be added to such machines without making fundamental alterations therein; by means of which paper is taken from rolls and compacted to form mouthpiece plugs, spaced sections of the tobacco wind-row are removed, plugs inserted in the resulting spaced recesses in the tobacco wind-row, the composite wind-row, now consisting alternately of plugs and tobacco sections, is finally wrapped, and is cut into individual cigarettes in accordance with standard practices.

In general terms, the method of accomplishing this consists of gripping spaced sections of the travelling tobacco wind-row, leaving alternate free sections therebetween, cutting completely through the tobacco wind-row but not through the wrapper paper thereunder near each end of the free sections, removing the free tobacco, inserting plugs in the resulting spaced recesses, removing the gripping means, closing and sealing the wrapper, and cutting the cigarette rod formed thereby into individual cigarettes in such a way that each cigarette carries a plug or a portion thereof as a mouthpiece. Preferably, the final cutting into cigarettes is so arranged that cuts are made through the center of each plug and tobacco section in a general way similar to the practice followed in cutting cork-tipped cigarettes.

Regarding the matter of cutting through the tobacco wind-row others have heretofore proposed to cut part way through this wind-row but such a step will not suffice for my purpose because a square end must be provided for the tobacco section against which the plug may be firmly abutted, in order that there will be no weakness in the cigarette at the plane of contact of the plug and the tobacco section. Further, a clean removal of the free tobacco between the cuts must be accomplished, in order that there will be no strands of tobacco remaining to extend between the plug and the wrapper.

I have found that even when using a cutter of razor-like sharpness, if the tobacco wind-row with the wrapper thereunder is supported on a hard and polished surface, it is possible to cut through the tobacco wind-row and apply very heavy pressure of the "razor" edge upon the wrapper paper without damage thereto provided there is no "sidewise" motion. Further, I have found that an edge of the thickness of the body of a safety razor blade will cut through the tobacco wind-row with entire satisfaction and will not damage the wrapper thereunder even if a slight sidewise motion occurs. The thicker edge is also desirable in that it greatly reduces the amount of sharpening necessary.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

Figure 2:
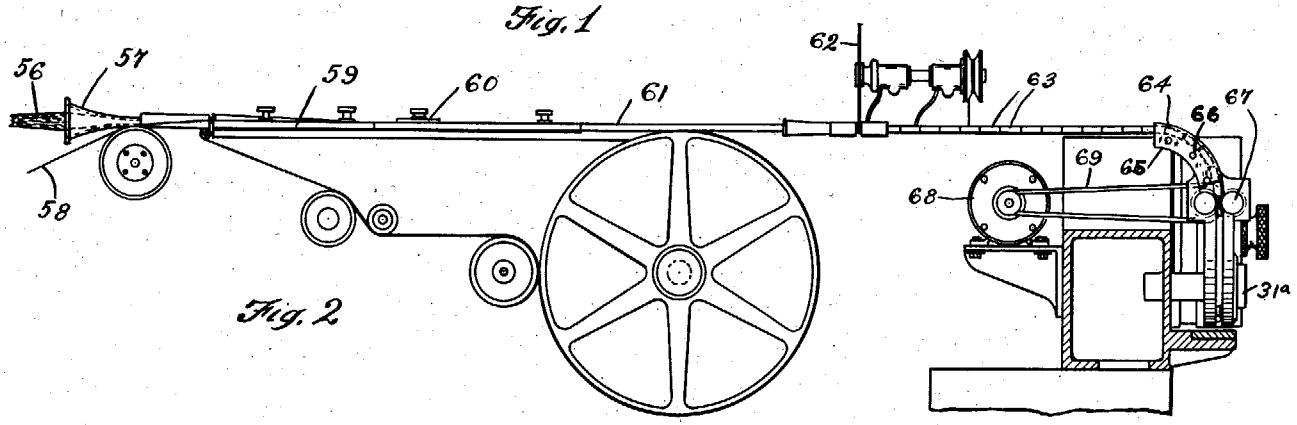
Figure 5:
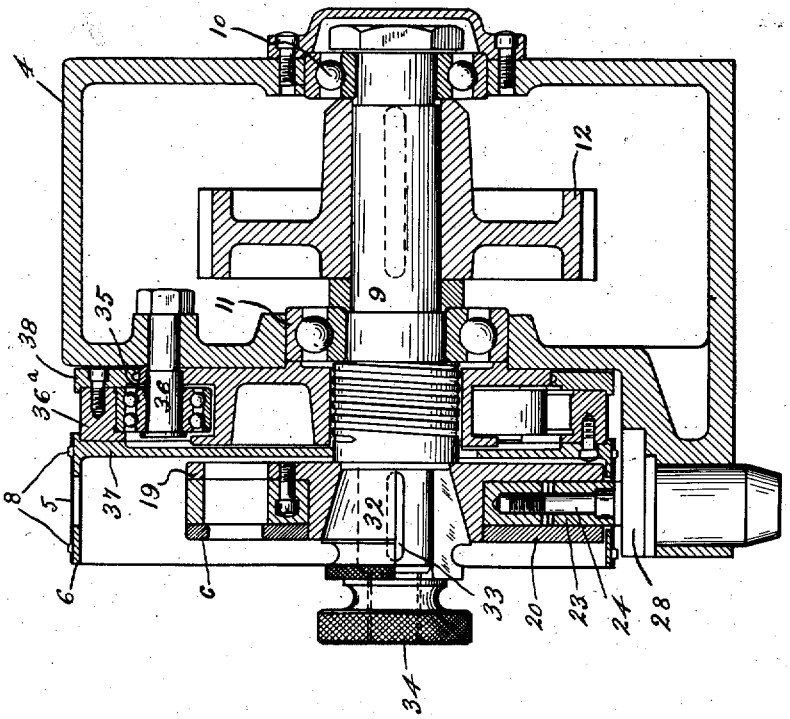
Figure 4:
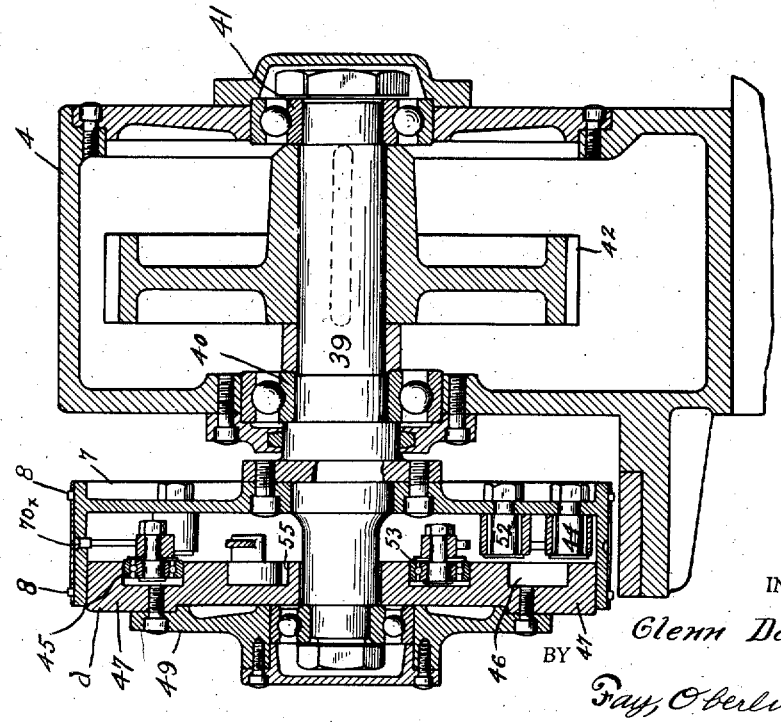
Figure 7:
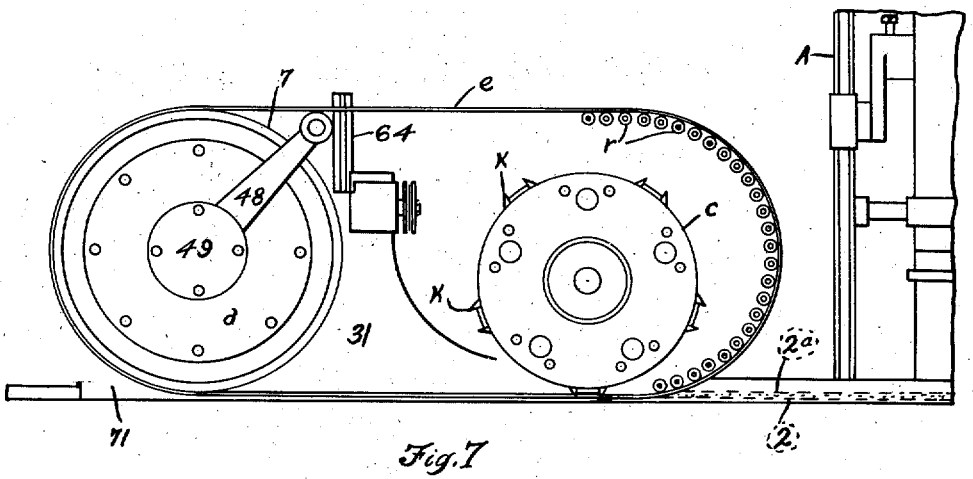
Figure 8:
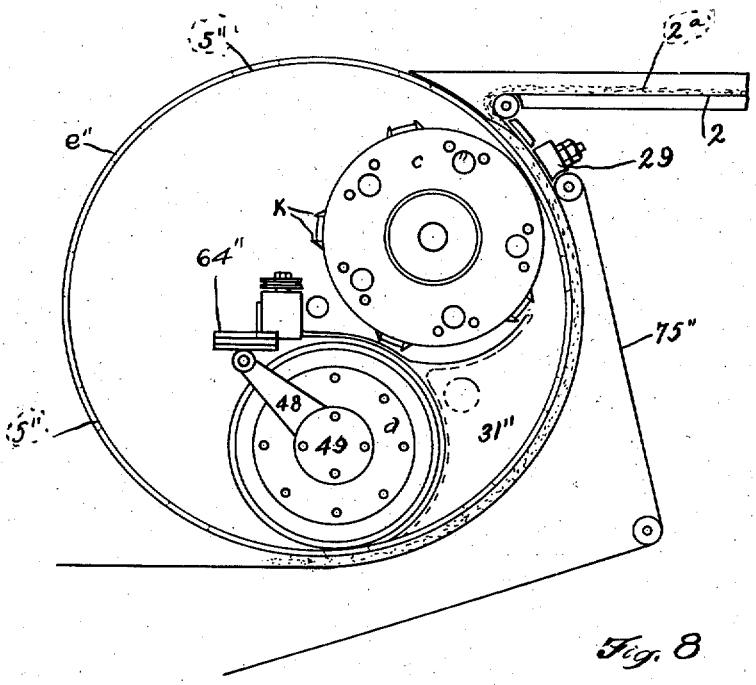

In said annexed drawings:

Fig. 1 is a side elevational view of mechanism embodying the invention; Fig. 2 is a side elevational view of the portion of the mechanism to the rear thereof, being taken on a plane at right angles and substantially on the line II—II, Fig. 1; Fig. 3 is an enlarged longitudinal vertical sectional detail; Fig. 4 is a further enlarged transverse section taken substantially on the line IV—IV, Fig. 3; Fig. 5 is similar section taken substantially on the line V—V, Fig. 3; and Figs. 6, 7 and 8 are fragmentary side elevational views of modifications.

In its general aspects, the invention contemplates formation of a tobacco body in continuous-length manner, inserting therein at spaced intervals a mouthpiece plug, as it may for convenience be termed, completing the formation of the assembled structure in rod-manner, and then severing into finished lengths each of which contains its mouthpiece plug abutting the tobacco body. Thus, tobacco in suitably prepared form for cigarettes may be continuously laid upon a travelling web of wrapper-paper, mouth-piece plugs may simultaneously be formed and be forwarded and placed in spaced positions in the tobacco filler body in spaces provided therefor by removal of tobacco portions at regular intervals, and the paper is then turned up about the assembly of alternate tobacco and mouthpiece plugs and is sealed to complete the continuous rod-form, whereupon it is fed to the severing mechanism for cutting into individual cigarette lengths.

As illustrated in Fig. 1, there is shown a means A for forming a continuous-type of cigarette filler by depositing the prepared tobacco upon a travelling web of wrapper-paper indicated by the dotted line 2. The detail of the tobacco body forming mechanism being immaterial to the present invention, and there being well known mechanism existent for this, further detailed description and showing thereof is unnecessary, and suffice it to say that the travelling wrapper-paper 2 with its provided wind-row of tobacco filler 2*a* is fed along progressively to the plug-inserting mechanism B. This is mounted upon the general framing 3 of the machine, and includes a housing 4 within which is the drive-gearing for actuating the respective elements including the cutter-carrying wheel *c*, the wheel plug-inserting means *d*, and the endless belt *e* which travels in relation therewith. The endless belt *e* is desirably in the form of a metal tape-like belt and having windows 5 (Fig. 5) at spaced intervals, through which the cutting elements and the plug-inserting elements successively operate, the belt *e* travelling over drums 6, 7, each of which has peripheral lugs 8 coacting sprocket-wise in corresponding small openings near each edge of the belt, for feeding the same positively, somewhat in the manner of the feed of a motion picture film. The drum or wheel 6 is an idler, and the drum or wheel 7 is positively driven. Mounted within, but unconnected to the wheel 6 is a shaft 9 preferably carried by the housing 4 by means of ball bearings 10, 11, the shaft being driven through its gearing 12 from a gear 13 which in turn meshes with a gear 14 on a shaft 15 actuated by a worm wheel 16 and a worm 17 on the main shaft 18. The projecting end of shaft 9 carries fixedly-attached the wheel-like member *c*, which comprises a back plate 19, and a face plate 20 suitably held by bolts or screws 21, and between which plates a series of cutters *k* is arranged. Each such cutter *k* comprises a wedge-block 23 supported by a cap screw 24, and having spaced cutting edges 25 such as to be suitable to cut through the wind-row of tobacco body carried along thereunder, without damaging the wrapper-paper therebeneath. Adjusting means for the cutter blades is provided, and this may take the form of shouldered slides 26 (see Fig. 3) bearing against the respective blades internally, and being adjustable by screws 27. In a position under and opposite each cutter *k* as it comes into functioning relation, is an anvil 28, resiliently supported by a spring 29 about the stem 30, the tension being such as to afford a slight yielding as the cutter is brought into operating position above. Between the wheels 6 and 7 is a housing or suction-head 31 having a connection-outlet 31*a* to a suitable source of vacuum. The cutters, while severing the tobacco, do not in themselves lift the severed portion from the tobacco stream, and thus the cut-out portions may be uniformly removed by the suction. By arranging the suction-head 31 against the cutter wheel, any possible stray particles of tobacco that might tend to follow around with the cutters are removed also. The cutter assembly is held together by a locking cone 32 which inserts into a corresponding recess in the rear plate 19, a key 33 insuring movement with the shaft when the cone is fixed in position by the securing means 34 which is screw threaded into the end of the shaft 9 and against the cone.

Surrounding the cutter wheel *c*, as aforementioned, is the idler wheel 6 for the belt *e*, and any suitable mounting therefor may be applied, for instance a series of ball bearings 35 (see Fig. 5), carried on studs 36 secured to the face of the housing 4, and upon such bearings an outer track-way 36*a* may engage, this being secured to the web 37 of the wheel 6, and to an inner ring 38 to complete the run-way channel. By such means, as seen, the wheel 6 may turn freely in the mounting, not interfering with the cutter wheel *c*.

The drive wheel 7 for the belt *e* is fastened to and driven by a shaft 39 (see Fig. 4) mounted in bearings 40, 41, in the housing 4. The shaft is driven in turn through a gear 42 which meshes with gear 13. The wheel 7 carries a series of pusher levers 43 (see also Fig. 3), these being pivotally connected to the wheel as by studs 44, and the extension end of each lever carries a cam-roller 45 which travels in a cam-race 46 in a stationary cam plate 47 anchored to the frame by any convenient means, for instance supportarm 48 connecting with a face-plate 49. The ends 50 of the levers 43 lie opposite openings in the periphery of the wheel 7, such as to be actuated by the cam to project out during a portion of the revolution of the wheel, and be drawn in during the remainder of the revolution. Carried also by the wheel 7 is another series of levers 51, mounted for instance by studs 52. These levers are of the general form of bell-crank levers having a cam roller 53 at one end and a feed finger 54 at the other end. The cam rollers 53 are also operated by a cam-race 55 in the stationary cam plate 47. The ends 54 of the levers are positioned opposite openings in the periphery of the wheel 7, such that the cam arrangement occasions a projection of each lever during a portion of the revolution of the wheel 7, and a retraction therewithin during the remainder of the revolution. Both sets of levers coact in the feed of the mouth-piece plugs. The latter are formed and forwarded thereto by the mechanism shown more extensively in Fig. 2. In this a strip of paper 56 is drawn together from a continuous web-feed, the detail of which is unnecessary to show, into a compacting cone 57 which provides a continuous rod or pencil which is laid in position on a web of wrapper paper 58 supplied from a suitable roll or other source, the detail of which is unnecessary to show, the wrapper web 58 being turned up about the pencil of paper filler, by the former-guides 59, and being sealed by the sealing means 60, whose precise detail is immaterial and need not be further described. The paper-filler, now enclosed in its wrapper, and progressing as a continuous rod or pencil 61, encounters cutting means, such for instance as revolving cutter knife 62, which may be similar to cutter mechanism known in the art for severing cigarettes, and which requires no further detail description. The severed plugs thence proceed to the inserting means, which may include a guide 64 having a face plate 65 adjustable by means of its holding screws 66 to provide suitable slight frictional engagement against its free forward feed. Desirably, the face plate 65 may be of plate glass. At the lower end of the curved guide 64 is a pair of kicker wheels 67 driven by any suitable means, for instance motor 68 and belt 69, these wheels being so positioned as to seize each filler plug 63 in turn and shove it into the grooved channel 70 of the housing 31 which coacts with the wheel 7. A corresponding groove 70*x* in the face of the wheel cooperates with grooved channel 70 to provide a circular cross section for the reception of the cylindrical plugs, such as to allow engagement of the feed-fingers 50 of the levers 43, the plug thus being fed down in relation to the tobacco on the wrapper 2. The lever-ends or fingers 51 serve to push the plugs radially outward from the wheel 7 at the instant of their insertion into the tobacco interspaces. Desirably, the feed finger 50 is given an exaggerated thrust movement timed with the contact of the filler plug with the tobacco as it is positioned in the pre-formed recess, such thrust forward serving to properly bed the filler-plug and tobacco together. For this, the cam path is properly shaped and the windows in the wheel 7 and belt *e* are slightly appropriately enlarged. Beyond the assembly-wheel 7 a former-guide 71 is arranged to turn the wrapper up about the sides of the tobacco and insert-plugs, the wrapper thence being sealed by suitable means 72, which may be of detail form as known in the art, and requiring no further description here. The cigarette rod or pencil 73 thence proceeds to cutting mechanism, which may comprise a cutter 74 whose detail and drive may be of any suitable form, such as known in the art, and which serves to cut the rod or pencil into finished cigarettes. In order to assure proper feed-action, an endless travelling belt 75 driven by belt-wheel 76 and suitable gearing 77, 78, coacts with the travelling wrapper 2 and contents.

In operation, the filler tobacco is fed down by the feed mechanism A, upon the continuous web of wrapper paper 2, thereby forming a continuous wind-row of tobacco, which is brought under the apertured belt *e*, and the solid portions of the belt grip spaced sections of the tobacco wind-row, leaving alternate sections exposed through the apertures 5. The cutters *k* carried by the cutter wheel *c* operate through these apertures to sever the tobacco wind-row but not the wrapper paper thereunder, near each end of the exposed sections of the wind-row. In this way, the sections of the tobacco wind-row reposing under the apertures in the belt are left entirely free, so that upon their advancement to a point beneath the suction head 31, these free sections are drawn off by vacuum through the outlet duct 31*a* and may be reintroduced into the feed as desired. It will be seen that the removal of the free sections leaves spaced recesses in what had previously been a continuous wind-row of tobacco. Meantime, the paper web 56 (Fig. 2) is being compacted into rod or pencil-form and wrapped within the wrapper web 58 and sealed up, and cut by the cutter 62 into lengths which desirably may be twice the length of the ultimately finished plug. These lengths 63 are fed down through the guide 64 and are seized by the kicker wheels 67 and shoved into the path of the feed-finger of the next approaching lever 43. At the same time, the lever-end 54 of the corresponding lever 51 engages the forward end of the plug and the latter is fed down and assembled in the prepared recess in the tobacco wind-row. It will be noticed that the plugs although starting from a point quite diverse from the line of the tobacco path of travel, are directed into union with it by a smoothly curved path, and the tobacco sections approaching the plug feeder 70 move tangentially to the path of the moving plugs. By such converging paths very high speed with accuracy of assembly becomes possible. Thereupon, the former-guide 71 turns the wrapper 2 up about the assembly, and it is sealed by the sealing means 72, forming the continuous rod or pencil 73 which is finally cut by the cutter means 74 into the finished cigarettes. The cutter means may be so arranged that alternate cuts pass through tobacco-filler and through plug-filler, thereby allowing one plug length 63 as supplied to the tobacco wind-row to ultimately be cut into the respective mouthpiece ends of adjoining cigarettes.

In some instances, instead of consolidating the recess-forming means or cutter wheel and the assembly wheel within the respective belt wheels, I may arrange the belt wheels independently, as belt wheels 6*a*, 7*a*, Fig. 6, carrying a belt *e'* which may be of caterpillar tread type if desired, and again provided with windows through which the cutters and feed elements may operate, as aforedescribed. Between the suction head 31 and the assembly means *d'* may then be arranged the plug guide 64, as already described.

In the form of the invention shown in Fig. 7, the endless belt *e* is driven by the wheel 7 as described in connection with Fig. 1, and the cutter-carrying wheel *c*, plug-inserting means *d*, and vacuum-head 31 are likewise similar. The belt is supported around the cutter-carrying wheel *c* however, by guide-means which may comprise rollers *r* suitably mounted to maintain the proper directive path for the belt travelling thereover, and by suitably spacing the nearest roll back from the cutter-carrying wheel *c* below, the belt *e* is brought into holding engagement with the wind-row of tobacco at a point quite in advance of the action of the cutters, and thereby any tendency of the latter to occasion slight displacement of tobacco strands, as might be the case with some stocks, is obviated, since the tobacco is firmly gripped by the belt in its compressive travel with relation to the wind-row of tobacco on the wrapper paper, to hold the material firmly during the successive action of the cutters.

Instead of a somewhat flexible belt, a rotary drum *e''*, Fig. 8 may be arranged. Such drum, as in the case of the belt, is provided with spaced apertures 5'', at intervals corresponding to the positioning for action of the cutters and plug-inserting members. The cutter-carrying wheels *c*, the plug-inserting means *d*, and the suction-head 31'' are positioned within the drum, while the travelling wrapper with its wind-row 2*a* of tobacco is guided to conform against the periphery of the drum at a point in advance of the cutter-carrying wheel *c*. The travelling belt 75'' is appropriately arranged to coact with the drum beginning at a point well up on its periphery, thereby assuring accurate maintenance and forward feed of the travelling material.

In the operation of the forms of the invention shown in Figs. 6, 7 and 8, the wind-row of tobacco 2*a*, formed as indicated by any desired means, superimposed upon the travelling web of wrapper paper, is guided beneath the travelling means for gripping spaced sections thereof, leaving alternate sections free, such travelling means being the apertured belt *e'*, *e*, or the apertured drum *e''* respectively. The cutters *k* then operate through the apertures, and the resulting free sections of the tobacco wind-row are removed under the vacuum-head 31, 31, or 31'' respectively, while the sections on the tobacco wind-row gripped by the solid portions of belt *e*, *e'* or drum *e''* are held intact. With the further progress beneath the plug-inserting means, the mouthpiece plugs are inserted into the spaced recesses left by the removal of the free sections of the tobacco, and the progressive assembly is wrapped, sealed, and cut into individual cigarettes, as indicated.

In its various aspects thus, the invention is seen to provide advantageous assembly of mouthpiece filter-plugs with a tobacco body, such plugs having the function of preventing tobacco shreds from loosening into the mouth of the user, and the entire assembly being accomplished in a manner consistent with high speed machine production. By reason furthermore, of the manner of drive, all steps of operation are carried out in exact relation, thus insuring uniformity of product.

Throughout the description and claims I have used the term "windrow of tobacco" to refer to a pile of tobacco which has a length greater than its width. Such windrow may be formed in many ways and corresponds to such terms as tobacco rod, tobacco body and other similar terms employed in this art.

Other modes of applying the principle of the invention may be employed, change being made as regards the details described, provided the features stated in any of the following claims, or the equivalent of such, be employed.

I therefore particularly point out and distinctly claim as my invention:—

1. A method of manufacturing mouthpiece cigarettes, which includes removing spaced sections of a wind-row of tobacco and associating mouthpiece plugs with the remainder of said wind-row in continuous manner, and enclosing said remainder and plugs in a wrapper thus forming a rod of indefinite length.

2. A method of manufacturing mouthpiece cigarettes, which includes the steps of advancing a web of wrapper paper, forming a wind-row of tobacco thereon, making spaced recesses by removing portions of such wind-row, inserting mouthpiece plugs in the spaced recesses, and then closing and sealing the wrapper about the resulting composite rod consisting of plugs and tobacco sections.

3. A method of manufacturing mouthpiece cigarettes, which includes the steps of advancing a web of wrapper paper, forming a wind-row of tobacco thereon, making spaced recesses by removing portions of such wind-row, inserting mouthpiece plugs in the spaced recesses, wrapping the resulting wind-row consisting alternately of plugs and tobacco sections to form a continuous rod, and cutting such continuous rod into individual cigarettes, each containing at one end a mouthpiece plug.

4. In a method of manufacturing mouthpiece cigarettes, the steps which comprise gripping portions of a continuous wind-row of tobacco upon a web of wrapper paper, cutting other portions of said wind-row, removing the portions cut therefrom, inserting mouthpiece plugs in place of the removed portions, and then closing and sealing the wrapper about the resulting composite rod consisting of plugs and tobacco sections.

5. In a method of manufacturing mouthpiece cigarettes, the steps which comprise removing portions of a continuous wind-row of tobacco, gripping the unremoved portions of said wind-row, inserting mouthpiece plugs in place of the removed portions and pushing said plugs forwardly to obtain relatively tight engagement between said plug and said tobacco, and then closing and sealing a wrapper about the resulting composite rod.

6. A method of manufacturing mouthpiece cigarettes, which includes the steps of advancing a web of wrapper paper, forming a wind-row of tobacco on it, gripping spaced sections of such wind-row, leaving alternate sections free, completely severing the wind-row as it lies on the underlying wrapper, near each end of the free sections, removing the free tobacco, inserting mouthpiece plugs in the resulting spaced recesses, closing and sealing the wrapper about the resulting composite rod consisting of plugs and tobacco sections, and finally cutting the rod into individual cigarettes.

7. A method of manufacturing mouthpiece cigarettes, which comprises forming a series of aligned spaced tobacco sections upon a web and then interposing mouthpiece sections between successive tobacco sections while moving such tobacco sections and mouthpiece sections in substantially the same direction, uniting such tobacco and mouthpiece sections to form a rod of relatively indefinite length, and severing such rod into individual cigarettes.

8. A method of manufacturing mouthpiece cigarettes, which comprises forming gaps in a continuous tobacco rod, by removing the tobacco from the rod at spaced intervals, to be filled with sections of mouthpiece filter plug material.

9. A method of manufacturing mouthpiece cigarettes, which comprises axially moving respective series of tobacco sections and mouthpiece plug sections, one such series in a path cutting into the path of the other series, and then moving both series together axially and joining the same.

10. A method of manufacturing mouthpiece cigarettes, which comprises moving spaced tobacco bodies axially along a predetermined path, moving filter-plug bodies axially in a curved path tangent to that of the tobacco bodies, and then moving both sets of bodies together axially and joining the same.

11. A method of manufacturing mouthpiece cigarettes, which comprises forming spaced sections of tobacco, moving filter-plug sections axially along a curved line of substantially tangential approach into association with the tobacco sections, and then moving both together axially and joining the same.

12. A method of manufacturing mouthpiece cigarettes, which comprises moving respective series of tobacco sections and mouthpiece sections in substantially the same plane, one such series in a path tangential to the path of the other series, and then moving both series together axially and joining the same.

13. A method of manufacturing mouthpiece cigarettes, which comprises moving spaced sections of mouthpiece material along a predetermined path, moving tobacco sections in substantially the same plane tangentially into the path thereof, and then moving both sets of sections together axially and joining the same.

14. A method of making mouthpiece cigarettes, which comprises forming by a non-offset path a moving train of tobacco sections, and feeding a train of axially aligned non-tobacco plugs by curved path into conjunction therewith in interpolating section arrangement.

15. In a method of manufacturing mouthpiece cigarettes, the steps which comprise providing a windrow of tobacco, gripping spaced sections of said windrow, removing the ungripped sections of said windrow and inserting mouthpiece plugs in the resulting spaces.

16. In a method of manufacturing mouthpiece cigarettes, the steps which comprise providing a windrow of tobacco, then removing spaced sections of said windrow, such removed sections being of less length than the remaining tobacco sections, and then associating mouthpiece plugs with the remaining tobacco sections.

17. In a method of manufacturing mouthpiece cigarettes, the steps which comprise providing a windrow of tobacco, then removing spaced sections of said windrow to form a train of spaced tobacco bodies, then moving said train along a line which is a projection of said windrow and then introducing mouthpiece plugs into the spaces between said tobacco bodies by moving said plugs in a path coincident with their lengths at an angle with the path of said train.

18. In a method of manufacturing mouthpiece cigarettes, the steps which comprise providing a windrow of tobacco, then removing spaced sections of said windrow to form a train of spaced tobacco bodies, then moving said spaced tobacco bodies axially, then introducing mouthpiece plugs into the spaces between said tobacco bodies by simultaneously moving said plugs in substantially the direction of movement of said tobacco bodies.

GLENN DAVIDSON.